United States Patent [19]

Reynolds

[11] Patent Number: 4,682,805
[45] Date of Patent: Jul. 28, 1987

[54] GRASPING FINGER POSITION SENSOR FOR A ROBOT SYSTEM

[75] Inventor: Robert W. Reynolds, Ridgefield, Conn.

[73] Assignee: The Perkin-Elmer Corporation, Norwalk, Conn.

[21] Appl. No.: 830,163

[22] Filed: Feb. 18, 1986

[51] Int. Cl.$^4$ .......................... B25J 15/08; B25J 19/02
[52] U.S. Cl. .................................. 294/86.4; 294/907; 901/31; 901/46
[58] Field of Search ...................... 294/86.4, 88, 103.1, 294/104, 106, 119.1, 907; 33/143 L; 324/59, 207, 208, 226, 234, 236, 239, 262; 414/729, 730, 739–741; 901/30–39, 46

[56] References Cited

U.S. PATENT DOCUMENTS

| | | | |
|---|---|---|---|
| 3,100,889 | 8/1963 | Cannon | 33/143 L X |
| 3,755,909 | 9/1973 | Asano et al. | 33/143 L |
| 4,509,783 | 4/1985 | Ionescu | 294/88 |
| 4,538,669 | 9/1985 | Markarian et al. | 33/143 L X |
| 4,577,509 | 3/1986 | Moser | 324/59 X |
| 4,600,357 | 7/1986 | Coules | 294/907 X |

Primary Examiner—Johnny D. Cherry
Attorney, Agent, or Firm—F. L. Masselle; E. T. Grimes

[57] ABSTRACT

The position sensor senses the position of a movable finger in relation to a cooperating finger. The position sensor includes a variable reactance device including two cooperating relatively movable reactance elements. One of the reactance elements is mechanically coupled to the movable finger and the other one of the reactance elements is mechanically coupled to a cooperating finger. The relative movement between the reactance elements is effective to vary the reactance of the variable reactance device. An oscillator circuit is connected with the variable reactance device so that the frequency of the oscillator circuit varies to provide a variable frequency output which represents the position of the movable finger with respect to the cooperating finger.

7 Claims, 5 Drawing Figures

GRASPING FINGER POSITION SENSOR FOR A ROBOT SYSTEM

BACKGROUND OF THE INVENTION

The present invention relates to a mechanism and system for measuring the opening between the grasping fingers of a mechanical robot. The invention is particularly useful for robots of the type employed in automatic chemical and biological analysis machines which may be operated in a corrosive atmosphere.

In robot systems for chemical and biological laboratories, highly corrosive atmospheres may be encountered because of the use of chemical solvents and reagents. Robots for carrying out laboratory tests in chemical and biological laboratories are coming into increasing use. one such system in available from Perkin-Elmer Corporation, Main Avenue (MS-12), Norwalk, Conn. 06856, U.S.A. under the designation "Master Lab System". That system is computer controlled, and is capable of doing a long series of tests on samples contained in test tubes without the necessity for supervision. In the operation of that robot system opposed fingers must grasp each test tube for manipulation of that test tube and for moving the test tube from one position to another.

It is essential in these operations that the control system must have some signal to indicate the relative positions of the grasping fingers so that the fingers are opened sufficiently to embrace the test tube which is to be grasped before the test tube is grasped, and so that the system has signals which indicate when the fingers have been opened to release a test tube.

Up to the present time, one common method for obtaining the finger opening position signals is through the use of a potentiometer which has an electromechanical contact which slides over a resistor element to register different positions in terms of variation in the resistance of the potentiometer. This system generally works satisfactorily, but has some serious potential disadvantages. These include the mechanical wear between the electromechanical contact and the resistor element, and the prospect of corrosion of the electromechanical contacts in the corrosive atmosphere which is often encountered in chemical and biological laboratories.

SUMMARY OF THE INVENTION

Accordingly, it is an important object of the present invention to provide an improved position sensing apparatus for a robot system which does not require the use of electromechanical contacts and which therefore avoids the problems associated with electromechanical contacts.

Further objects and advantages of the invention will be apparent from the following description and the accompanying drawings.

In carrying out the invention there is provided in a robot system having at least one finger element which is movable in opposition to at least one cooperating finger element to grasp an object to be manipulated. A drive mechanism is coupled to the movable finger element and a position sensing means senses the position of the movable finger element in relation to the cooperating finger element. The position sensing means comprises a variable reactance device including two cooperating reactance elements, at least one of which is movable with respect to the other and is mechanically coupled to movable finger element for movement therewith. The other of the reactance elements is mechanically coupled to the cooperating finger element, the relative movement between the reactance elements being effective to vary the reactance of the variable reactance device. A variable frequency oscillator (VFO) circuit is connected with the variable reactance device, the frequency of the VFO circuit being variable in response to the variation in the reactance of said variable reactance device. Thus, a frequency output signal which represents a measure of the position of the movable finger element with respect to the cooperating finger element.

The term "reactance" is used in its general meaning in this specification to refer to either a capacitive reactance or an inductive reactance.

DESCRIPTION OF PREFERRED EMBODIMENTS

Figure 1:
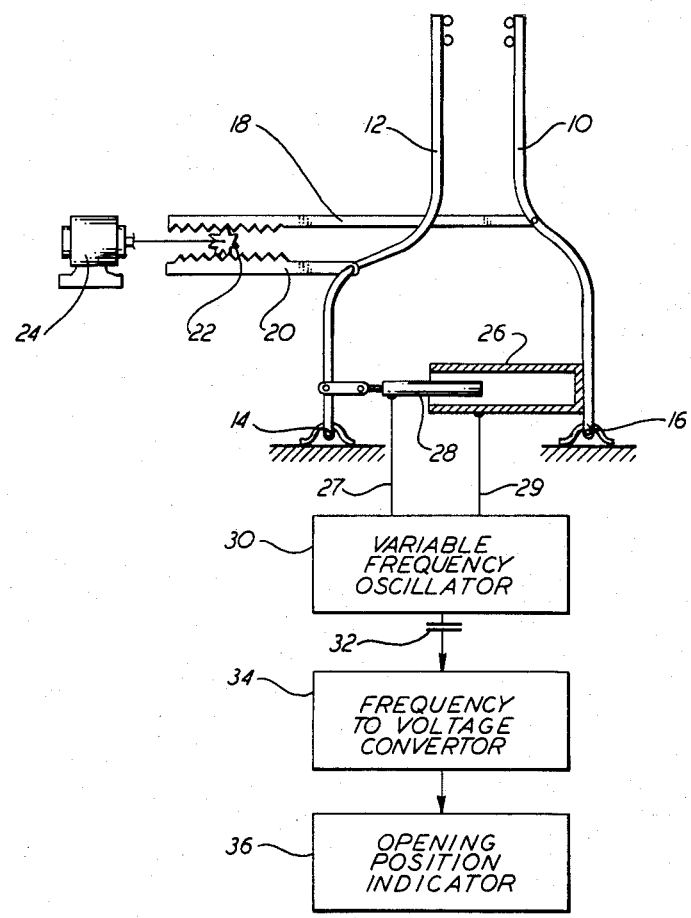
FIG. 1 is a schematic representation of a preferred embodiment of the invention.
Figure 2:
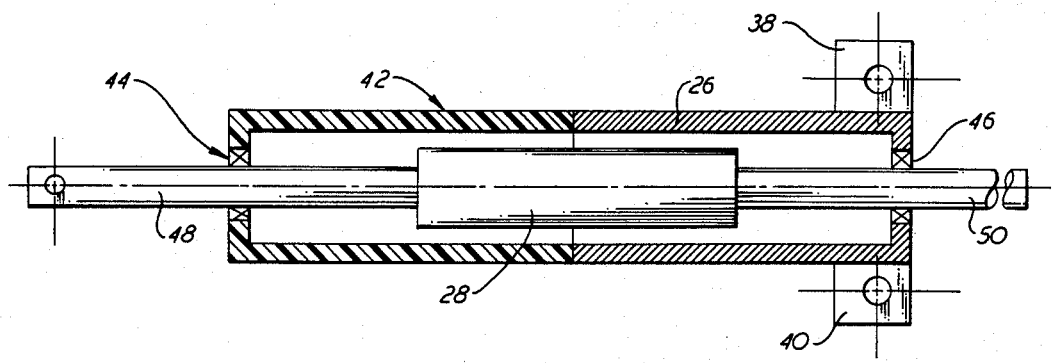
FIG. 2 is an enlarged mechanical sectional view illustrating a preferred embodiment of a variable capacitive reactance device employed in the embodiment of FIG. 1.

Referring particularly to FIG. 1, there are shown the fingers 10 and 12 of a robotic hand which are pivotally mounted to the body of the robot as indicated at 14 and 16. The fingers 10 and 12 are movable simultaneously towards one another or away from one another by means of gear rack elements 18 and 20 which are driven through a common pinion gear 22 by a motor 24. The relative positions of the fingers 10 and 12 (the spacing between those fingers) is detectable in accordance with the present invention by a variable reactance device which, in the embodiment of FIG. 1, comprises a variable capacitive reactance device. The device includes a tubular electrode element 26, and a tubular plunger electrode element 28 which are respectively connected to the fingers 10 and 12. As the fingers 10 and 12 are moved towards one another, or away from one another, the relative movement between the tubular electrode 26 and the plunger electrode 28 causes a variation in the depth of penetration of the plunger 28 into the tube 26. This changes the electrical capacity between these two electrodes. As illustrated in FIG. 2 and described below, bearings are provided to maintain a uniform spacing between the outer surface of the plunger 28 and the inside surface of the tubular member 26.

The variation in the electrical capacity of the variable reactance device comprised of the tubular electrode 26 and the plunger electrode 28 is detectable by a variable frequency oscillator 30. The variation in the reactance of the variable reactance device causes the frequency of the oscillator to vary in a predictable manner. The frequency of the variable frequency oscillator may be measured directly as a measure of the spacing between the fingers 10 and 12 by means of digital circuitry, not shown. Alternatively, the variable frequency output of the oscillator 30 is coupled through a capacitor 32 to a frequency-to-voltage convertor circuit 34, and the resultant voltage may be supplied to an indicating device, or to a control circuit, as indicated at 36. The frequency-to-voltage convertor may comprise a standard National Semiconductor circuit LM331.

One of the major advantages of the invention, and particularly of this embodiment of the invention, is that the relative movement between the fingers 10 and 12, and the resultant relative movement between the tubular electrode element 26 and the plunger electrode element 28 do not require any relative movement between electrical contacts, such as the sliding electrical contact involved in the operation of a potentiometer. Thus, there is no degradation in the operation of the device occasioned by contact wear, and the acceleration of contact wear because of corrosive atmospheres.

FIG. 2 is a more detailed mechanical representation of the variable reactance device including the tubular electrode 26 and the plunger electrode 28, and showing one preferred arrangement for the bearings which keep these elements spaced apart. The tubular electrode 26 is shown in cross-section.

In this preferred embodiment, the tubular electrode element 26 includes attachment means for attaching the electrode element to the associated finger 12 including attachment flanges 38 and 40. Also, at the other end of the tubular electrode 26 there is provided a tubular extension 42 which is composed of a nonconductive material such as a synthetic resin.

The ends of the enclosures formed by the tubular electrode 26 and the extension 42 include sliding bearings 44 and 46. These bearings cooperate with the operating shaft 48 of the plunger 28, and the extended operating shaft 50 to maintain the plunger 28 centered within the enclosure. Shafts 48 and 50 may comprise integral parts of the plunger 28.

In order to avoid inserting any change in the electrical capacitance through the bearing structure 46, the guide shaft 50 is preferably composed of synthetic resin material such as polytetrafluoroethylene, which is often indentified with the DuPont trademark "Teflon". Also, the bearings 44 and 46 are preferably composed of an organic, nonconductive material.

Alternatively, the guide shaft 50 may be formed integrally with the plunger element 28 of conductive material, and the entire end of the tubular electrode element 26 which supports the bearing 46 may be composed of a nonconductive dielectric material.

Figure 3:
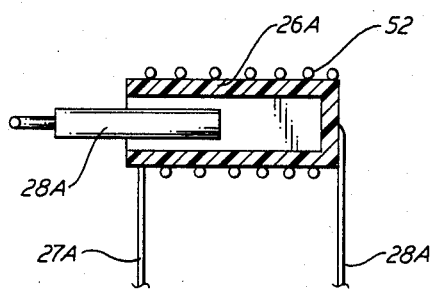
FIG. 3 is a schematic detail view of a variable inductive reactance device which may be alternatively employed in the embodiment of FIG. 1.

FIG. 3 is a detail view illustrating an alternative form of the variable reactance device having cooperating elements. In the embodiment of FIG. 3, the variable reactance device includes a tubular element 26A which has an inductive winding 52, the inductance of which is changed by the variation in the depth of the penetration of a magnetic core plunger 28A into the tubular element 26A. Again, the variable inductance is used to vary the frequency of a variable frequency oscillator (not shown) which is cnnected at the winding connections 27A and 28A. The body of the tubular element 26A is composed of a dielectric, and is shown in section. The dielectric material is preferably a synthetic resin.

Figure 4:
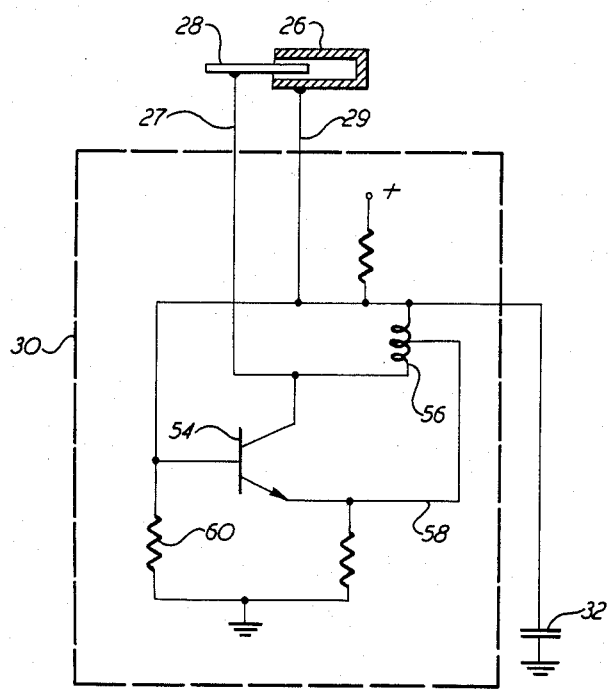
FIG. 4 is a circuit diagram illustrating an oscillator circuit which may be employed in the embodiment of FIG. 1.

FIG. 4 illustrates one circuit which may be employed for the variable frequency oscillator 30 in the embodiment of FIG. 1. The oscillator is known as a Hartley oscillator, and employs an NPN transistor 54. The variable capacitive reactance device formed from tubular electrode 26 and plunger electrode 28 form a part of a "tank" circuit including an inductor 56 which determines the frequency of the output to the coupling capacitor 32. This tank circuit is connected to the collector of the transistor 54. A feedback to sustain the oscillations is applied to the emitter of transistor 54 from a tap on the inductor 56 through a connection 58. Resistor 60 is provided to prevent the transistor from saturating and becoming biased to cut-off.

Figure 5:
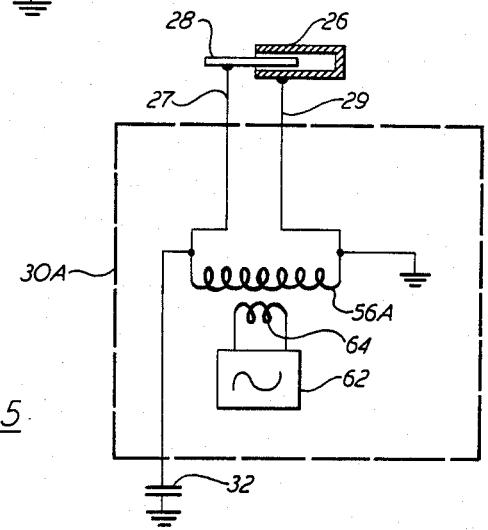
FIG. 5 is a schematic circuit diagram of an alternative oscillator circuit which may be employed in the embodiment of FIG. 1.

FIG. 5 illustrates an alternative arrangement 30A of the oscillator. In this alternative arrangement, the frequency of the oscillator is again determined by a "tank" circuit including an inductor 56A which operates in conjunction with the variable capacitive reactance device including elements 26 and 28 to determine the oscillator frequency. In this embodiment, the oscillations are triggered by an oscillator device 62, which may be of conventional construction, and which is inductively coupled to the reactance 56A by a coupling winding 64.

This invention has been described in terms of an embodiment which provides for concurrent movement of two cooperating finger elements. However, it will be understood that one of the fingers may be fixed in position in relation to the arm to which it is attached, while the other finger may be movable. The important principle is that there must be relative movement between the fingers by providing for movement of one or both of the fingers.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

What is claimed is:

1. In a robot system having at least one finger element which is movable in opposition to at least one cooperating finger element to grasp an object to be manipulated, a drive mechanism coupled to said movable finger element, a position sensing means for sensing the position of said movable finger element in relation to said cooperating finger element, said position sensing means comprising a variable reactance device including two cooperating reactance elements, at least one of said reactance elements being movable with respect to the other one of said reactance elements and being mechanicaly coupled to said movable finger element for movement therewith, the other one of said reactance elements being mechanically coupled to said cooperating finger element, the relative movement between said reactance elements being effective to vary the reactance of said variable reactance device, an oscillator circuit connected with said variable reactance device, the frequency of said oscillator circuit being variable in response to the variation in the reactance of said variable reactance device to thereby provide a frequency output signal which represents a measure of the position of said movable finger element with respect to said cooperating finger element.

2. A system as claimed in claim 1 wherein said drive mechanism is coupled to said cooperating finger element to drive said cooperating finger element for movement in opposition to said movable finger element.

3. A system as claimed in claim 1 wherein one of said two cooperating reactance elements of said variable reactance device comprises a hollow cylindrical tube member and the other one of said cooperating reactance elements comprises a cylindrical plunger member, the relative movement between said reactance elements being effective to cause said plunger element to have varying positions of penetration into said tube member.

4. A system as claimed in claim 3 wherein said tube member and said plunger member are each composed essentially of electrically conductive material and said members are electricaly insulated from one another and form a variable capacitive reactance device.

5. A system as claimed in claim 3 wherein said tube member comprises a coil form and includes an inductive winding thereon, and wherein said plunger member is composed of a magnetic material so that said plunger member is effective to change the inductive reactance of said winding depending upon the axial position of said plunger member within said tube member so that said cooperating reactance elements form a variable inductive reactance device.

6. A system as claimed in claim 3 wherein said oscillator circuit includes a parallel resonance circuit.

7. A system as claimed in claim 3 which includes a frequency-to-voltage convertor to convert the frequency output to a voltage output.

* * * * *